Patented May 13, 1952

2,596,450

UNITED STATES PATENT OFFICE 2,596,450

CORROSION-INHIBITING COATING COMPOSITION CONTAINING ORGANIC AMINE NITRITES

Aaron Wachter and Nathan Stillman, Berkeley, Calif., assignors to Shell Development Company, San Francisco, Calif., a corporation of Delaware No Drawing. Application October 28, 1946, Serial No. 706,099

13 Claims. (Cl. 106—14)

The present invention relates to coating compositions particularly adapted for coating metals to preserve them against corrosion which normally occurs from the joint action of air (oxygen) and water. More particularly, this invention relates to novel compositions comprising coating materials, which may be of a permanent or semi-permanent, and strippable or non-strippable nature, and which contain certain new agents which inhibit the aforesaid corrosion.

In the past, difficulties have been experienced in the prevention of corrosion of metals by painting, varnishing, or coating them with various conventional compositions. The major defect has been that the various paints, varnishes or coatings employed were not completely effective and failed to prevent serious corrosion of metals, e. g. steel, aluminum, etc. under conditions of use, as when immersed in sea water, or exposed to atmospheric conditions, or to various aqueous corrosion-producing atmospheres which have a pH value in excess of about 5.5.

It is therefore an object of the present invention to overcome the above and other defects. A main object of the present invention is to provide coating compositions which, when applied to metals, protect them from corrosion which normally occurs in the presence of water vapor and oxygen. A further object is to provide either strippable or non-strippable coatings for metals, such coatings being suitable for inhibiting corrosion of the coated metal.

It has now been discovered that the above and other objects may be attained by a composition which comprises an adherent coating material for a metal and a salt of an organic base and nitrous acid. It was further discovered that corrosion of a corrodible metal (which may otherwise occur even when it is coated with conventional coating compositions) is prevented by the presence in such a coating composition of a salt of an organic base and nitrous acid, i. e. an organic base nitrite. Although any organic base nitrite may be employed for the preparation of the novel compositions described herein, it is preferred generally to employ an organic nitrogenous base nitrite, and particularly, a nitrite salt formed by the addition of nitrous acid to a trivalent basic nitrogen atom of an organic compound. The latter salts may be referred to herein under the term "nitrite salts of trivalent basic nitrogen atom-containing organic compounds," or as "non-quaternary organic nitrogenous base nitrites." To this preferred class belong the nitrite salts of: e. g. primary amines, secondary amines, tertiary amines, substituted and unsubstituted guanidines, cyclic secondary amines of the type of piperidine, oxazines, dioxazines, thiaoxazines, morpholine, pyrrolidine, urea, thiourea, hydrazines, hydroxylamines, and amidines. More preferably, the present corrosion-inhibiting coating compositions contain primary or secondary amine nitrite salts. Dispersions of these compositions in water should preferably form an aqueous phase having a pH value in excess of about 6. Particularly preferred in this class of inhibitors are the secondary amine nitrates, especially those wherein the basic nitrogen atom is attached to unsubstituted or substituted cyclohexyl groups, as well as the various alkylated, cycloalkylated, arylalkylated, or unsubstituted guanidine nitrates.

The basicity of the various basic constituents of the class of salts described herein is described, for example, in the "The Organic Chemistry of Nitrogen" by N. V. Sidgwick, 1937 edition, and in "Organic Chemistry" by Paul Karrer, 1938 edition.

More specifically, the organic nitrogen base salts of nitrous acid within the scope of the present invention include the nitrite salts of:

1. Primary amines, such as
(a) primary amines in which the amine group is attached to a secondary or a tertiary aliphatic carbon atom as in the following structural formulas:

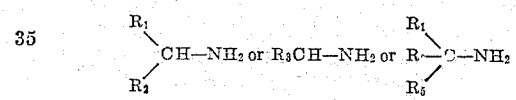

wherein $R_1$, $R_2$ and $R_5$ are hydrocarbon radicals which are aliphatic, alicyclic, heterocyclic, aromatic, or alkylated cyclic radicals, and may, if desired, contain preferably not more than one olefinic double bond, or $R_1$ and $R_2$ are joined in the form of a cyclo-aliphatic or heterocyclic-aliphatic ring radical $R_3$:

(b) primary amines in which the amine group is attached to an aralkyl group as in the following structural formula:

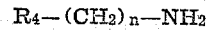

wherein $R_4$ is an aromatic hydrocarbon radical, preferably a phenyl or alkylated phenyl radical and $n$ is an integer which is preferably 1 or 2:

(c) primary aliphatic amines, such as methyl amine, which react with nitrous acid in the presence of an excess of the amine to give a primary amine nitrite salt (as distinguished from a primary aliphatic amine which reacts with nitrous acid to yield nitrogen, an alcohol, or other reaction products).

2. Secondary amines, such as secondary amines in which the amine group is attached to an aliphatic carbon atom, preferably a secondary or tertiary carbon atom, as represented by the following structural formulas:

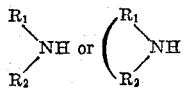

wherein R₁ and R₂ are hydrocarbon radicals as in 1 (a) and wherein R₁ and R₂ may be joined in the form of a ring forming

which is either N-alicyclic or contains in the R₃ portion of the organic ring atoms of the type of oxygen and/or sulfur.

3. Tertiary amines.

4. Quaternary ammonium bases including pyridinium bases.

Specified examples of organic nitrogen bases suitable for preparation of the organic nitrogen-base nitrite salt vapor phase corrosion inhibitors suitable for use in the present invention include:

Primary amines: methylamine, isopropyl amine, 2-amino-butane, tertiary butyl amine, 2-amino-4-methyl-pentane, various amyl, hexyl, heptyl, octyl, and higher homologous primary amines wherein the amine group is attached to a secondary or tertiary carbon atom: cyclopentyl amine, alkylated cyclopentyl amines, cyclohexylamine, mono-methyl cyclohexylamines, dimethyl cyclohexylamines, trimethyl cyclohexylamines, other alkylated cyclohexylamines, bornyl amine, fenchyl amine, cycloterpenyl amines, pinyl amine, benzylamine, betaphenylethylamine, alkylated benzylamines, tetrahydro betanaphthylamine, allyl amine, beta-methyl allyl amine, beta-chloro allyl amine, and their homologs and analogs.

Secondary amines: di-methyl-, di-ethyl-, di-n-propyl-di-isopropyl-, di-butyl-amines; various secondary amines derived from amyl, hexyl, heptyl, octyl, and higher homologous alkyl groups; methyl isobutyl amine, N-methyl N-tertiary-butyl amine, N-alkyl N-cyclohexyl amine, N-alkyl N-bornyl amine, di-bornyl amine, N-menthyl N-cycloterpenyl amine, N-isopropyl N-(1) menthyl amine, N-alkyl N-benzyl amines and their homologs and analogs; dicyclopentyl amine, dicyclohexyl amine, alkylated dicyclohexyl amines; diphenylamine, dibenzylamine, di-(beta phenyl ethyl) amine; piperidine, piperazine, alkylated piperidines or piperazines; alkylated and unalkylated oxazines such as morpholine, 2,4,4,6-tetramethyl tetrahydro-1,3-oxazine; alkylated-1,3-thiazolines such as 2,4,4-6-tetramethyl tetrahydro-3-thiazoline.

Secondary amine type derivatives of alkylene diamines, such as:

$$R_1-NH-R_2-HN-R_3$$

wherein R₁ and R₃ may be like or different aliphatic, alicyclic, aralkyl, alkarylalkyl, heterocyclic, terpenic radicals, and wherein R₂ is an alkylene or cycloalkylene radical. These R₁ and R₃ radicals for instance, may be isopropyl, butyl, cyclohexyl, benzyl, and/or bornyl radicals. The R₂ radical is preferably an ethylene or propylene radical.

Tertiary amines: trimethyl amine, triethylamine, tri-n-propylamine, tri-isopropylamine, tributylamine, higher homologous and isomeric trialkylamines, variously N-substituted tertiary amines having different organic radicals on the amine nitrogen atom, e. g., alkyl, alicyclic, bornyl, fenchyl, aralkyl, and like homologs and analogs; and tertiary amine type derivatives of alkylene diamines.

Organic nitrogenous bases, particularly guanidine; also diazoles, imidazolines, e. g., 2-heptyl-2-imidazoline, diazines, pyrimidines, and the like.

Quaternary ammonium bases: tetramethyl, tetraethyl, and higher tetra-alkyl ammonium bases; trimethyl benzyl-, trimethyl cyclohexyl-, tributyl decyl ammonium bases; various quaternary N-substituted ammonium bases having various organic radicals (of the type described above) on the quaternary nitrogen atom; pyridinium and alkylated pyridinium or quinolinium quaternary ammonium bases having an alkyl, cycloalkyl, or aralkyl group on the quaternary nitrogen atom, including methyl, butyl, cyclohexyl, benzyl groups and like homologs or analogs.

The various hydrocarbon radicals or groups of the above organic bases may also contain stable and/or inert polar substituent atoms or radicals, such as, chlorine, ether, thio-ether, alcohol, free amino, or nitro groups. Neutral ketone, ester and nitrile groups and aliphatic unsaturation may also be present, particularly in the case of allyl and chlorallyl groups.

The salts of nitrous acid and the organic nitrogen bases described above, may be prepared by a stoichiometric reaction of an organic nitrogen base with nitrous acid while maintaining the reaction mixture at least slightly basic in character.

Other organic salts of nitrous acid which are suitable as corrosion inhibitors in coating compositions according to the present invention are the sulfonium, phosphonium, or iodonium organic nitrite salts. Among these onium nitrites, the sulfonium nitrites are preferred. In general, nitrite salts of the isologs of the ammonium compounds, commonly termed "onium" compounds, and which have the general formula RXHy wherein R is an organic radical which may be alkyl, cycloalkyl, aryl, alkaryl, aralkyl or heterocyclic; X is an element selected from the group consisting of phosphorus, arsenic, antimony, selenium, tin, and iodine; and y is an integer which varies from 2 to 4 depending on the valence of X, may suitably be incorporated into coatings materials for preventing corrosion.

In any of the above nuclei containing a basic organic structure attached to a nitrite anion, particularly in the case of organic nitrogenous base nitrites, alkyl, cycloalkyl, terpinyl, bornyl, aralkyl, benzyl, phenyl, aryl and other substituent groups or radicals, may be present as long as the total basicity of the nitrogenous compound is approximately equal to or greater than the acidity of nitrous acid with which it forms a salt. Among the substituent groups, the alkyl and cycloalkyl groups are preferred.

The term "coating material for a metal," as used herein, refers to any slightly acidic, substantially neutral, or basic-reacting coating adapted for adhering relatively rigidly to solid metal. Such a coating material is of the type which is applied in liquid form or as a spray, and then sets, or gels, or hardens sufficiently to form a substantially non-fluent solid, semi-solid, or plastic coherent coating adherent to the surface of the metal. Such a coating may be of the modified type which may subsequently be peeled or stripped from the coated metal. The term "coating material" as used herein thus denotes the kind of coating which acts as a physical barrier over a metal to prevent free access of air and moisture thereto, but which in itself has substantially no powers of inhibiting corrosion of the metal by a chemical mode of operation. The term "coating material for a metal" thus includes lacquers, paints, varnishes, gel-forming coating formulations, natural resins for paints or coatings, synthetic resins comprising high molecular weight resins from reaction of polyhydroxy alcohols as ethylene glycol, glycerin or pentaerythritol with polycarboxylic acids (as phthalic acid or preferably its anhydride, or adipic, sebacic acids, etc. such as are generally known as alkyd resins), also alkylated cellulose (e. g. ethyl cellulose), polyamides, polyesters, also modified natural resins (e. g. shellac), polyalkylenes (e. g. polyethylene, polyisobutylene), modified or unmodified wax coatings, natural polar waxes (e. g. of the high molecular weight mono-ester type), petroleum non-polar hydrocarbon waxes, etc., all of which when broken up and agitated with water do not render the water acidic below a pH of about 6, and more preferably not below a pH of about 7.

Lacquers (which dry by evaporation and not oxidation) are most preferred as carriers of the corrosion-inhibiting organic base nitrites. The solids in these lacquers are more preferably made up of cellulose ethers (alkylated celluloses) or are those of the resin base type. As substitutes for ethyl cellulose, e. g., polyvinyl chloride-polyvinyl acetate, or nitrocellulose may be used in the lacquer. Strippable coatings of the solvent applied type are usually based on ethyl cellulose or polyvinyl chloride-polyvinyl acetate resin, for example, and contain well-known plasticizers used therewith.

Suitable resins include both natural and synthetic resins of the types well known in the varnish and lacquer art. Thus, among natural resins are elemi, damar, and the like and modified natural resins like ester gum. Synthetic resins such as alkyd and phenol-aldehyde resins, oil-modified synthetic resins and many others are suitable as carrier bases. Generally, the lacquer type of coating compositions are made up of mixed bases and other added materials like plasticizers. Such compositions also comprise a solvent or a mixture of solvents of the usual types. Preferably, the solvent-containing coating compositions having organic base nitrites incorporated therein are air-dried at room temperatures or somewhat above.

The corrosion-inhibiting compositions are also made up with spar varnish, basing the amounts of organic base nitrite (as given herein-after) on the non-volatile portion of the varnish. It is also possible to use straight boiled linseed oil as a vehicle for an organic nitrogenous-base nitrite.

Emulsion types of water dispersed paints, including asphalt emulsions, or emulsions of water with alkyd resins, are suitable for incorporating the present organic nitrites. Emulsions containing essentially asphalt usually have casein and/or gluten as partial film-formers, protective colloids, and emulsifiers together with a soap and a little free alkali. These and like aqueous paints become dry by evaporation of the water. The alkyd and/or casein based aqueous paints are highly suitable.

It will be appreciated that the amount of organic base nitrites required or necessary in the present compositions to obtain optimum corrosion prevention during their use as coatings on metals, depends upon a number of variables, e. g., the severity of conditions, temperature, degree of humidity, degree of circulation of water and/or air over the coating, the particular organic base nitrite employed, etc. In general, the use of a coating composition containing between about 0.02 weight percent and about 20 weight percent, or higher, of one or more organic base nitrites, based on the weight of the substantially solid carrier materials in the coating material for a metal, provides satisfactory corrosion inhibition. The particular weight percentage within the specified range depends essentially upon the variables described. More often under conditions of high humidity and elevated temperatures, e. g. about 90° F. to 120° F., or higher, it is preferred to use a concentration of between about 2 weight percent and about 12 weight percent of an organic nitrogenous base nitrite salt in the coating compositions.

Stability of the organic base nitrites, particularly of organic nitrogen base nitrites, is assured or obtained by having the present compositions slightly alkaline in reaction. In those applications wherein water having acidic characteristics is encountered, a small quantity of an alkaline or basic-acting agent sufficient to neutralize acidity which may develop, should be added to the present coating compositions. The desired pH above about 6 may be maintained within the composition, when necessary, by incorporating therein various organic or inorganic basic-acting materials. Among these, e. g. are sodium hydroxide, 3,3,5-trimethyl-cyclohexyl amine, dicyclohexyl amine, amyl amine, benzyl trimethyl quaternary ammonium hydroxide, etc., more preferably stearyl amine ($C_{18}H_{37}NH_2$) and the like higher amines. When the coating material for a metal is such as to remain with a pH value in excess of about 6, or even 5.5, and preferably above a pH of about 7, the stability of most of the organic base nitrites is sufficient for the present purpose so as not to need the presence of a basic-acting stabilizing agent therein. Where stabilization appears desirable, in general, between about 0.1% and about 25% of the stabilizer (by weight of the organic base nitrite) are effective.

The present corrosion-inhibiting coating compositions are more effective in preventing aqueous corrosion of various ferrous metals, e. g. steels, and also aluminum, as well as couples of aluminum, copper, brass or solder with steels.

The present coatings or paints which contain organic nitrites, are particularly useful in the form of transparent clear lacquers for preventing corrosion of metal. In this case the compatibility of the organic nitrogenous-base nitrites is outstanding. The present coatings are also particularly useful as semi-permanent strippable coatings, and also in the pigmented type of coatings which generally have colors lighter than the yellows produced by inorganic zinc or lead chromate salts. Such chromates may be present; however, incorporation of the present inhibitors is most useful where the chromates are absent and the quality of the lighter colors must be maintained. The present coatings are also particularly useful as marine paints, e. g., for use as a primer coat in painting ship bottoms or the hulls of boats.

For purposes of further illustration, reference will now be made to the following examples, it being understood that there is no intention of being limited to the specific conditions disclosed therein.

EXAMPLE I

|  | Volume per cent |
|---|---|
| Amy acetate | 15 |
| Butyl acetate | 30 |
| Ethyl alcohol | 9 |
| Butyl alcohol | 14 |
| Toluene | 5 |
| Xylene | 5 |
| Damar solution (6 lbs. resin/gal. Solvent A) | 15 |
| Oxidizing type of oil modified alkyd resin; 6 lbs. of resin per gallon of toluene | 5 |
| Shellac solution (6 lbs. shellac/gal. ethanol) | 2 |
|  | 100 |

*Solvent A*

| Ethyl alcohol | 50 |
|---|---|
| Ethyl acetate | 20 |
| Low boiling petroleum naphtha | 30 |
|  | 100 |
| Ethyl cellulose | 7 oz./gal. of above |

To the above mixed lacquer there is added 5% by volume of a 20 weight per cent solution of di-cyclohexylamine nitrite in methyl alcohol. This results in a lacquer containing one part by weight of the organic nitrite per 100 parts by volume of the applied solvent-containing lacquer. When this lacquer is applied to a low carbon steel plate, the resultant coating thereof shows effective prevention of the rusting of the steel which otherwise occurs with the coating in the absence of the di-cyclohexyl amine nitrite.

In place of the 7 oz. of ethyl cellulose in the above formulation, there may be added:

| 125-centipoises nitrocellulose | 5 oz./gal. of above, and |
|---|---|
| 6-second nitrocellulose | 1 oz./gal. of above. |

EXAMPLE II

The ethyl cellulose used herein was of the type which has from 48.5% to 50 weight per cent ethoxyl content and a viscosity of 80 to 100 centipoises when in the form of a 5 weight per cent solution in 80 weight per cent toluene-20 weight per cent ethanol at 25° C. The formulation used for coating steel was made up as follows:

|  | Parts by weight |
|---|---|
| Ethyl cellulose | 75 |
| Ethyl alcohol solution containing 6 weight per cent of di-cyclohexylamine nitrite | 125 |
| Absolute ethyl alcohol | 7.5 |
| Toluene | 292.5 |

The above blended lacquer was painted onto the surface of a sand-blasted low carbon steel panel and let stand overnight in order to provide evaporation of the volatile solvents in the lacquer and to form the residual solid coating on the metal. The thus coated metal was then placed above an open reservoir of tap water within a glass container and maintained at a temperature of about 25° C., for 22 days. No rust or other apparent change was evident. After this time the same sample was further subjected to a temperature of 32° C. for an additional 18 days, and no rust was found. The temperature was then raised to 50° C. and after 13 days at this temperature, there were no signs of corrosion. The test on the control was carried out in the same way using the following formulation.

|  | Parts by weight |
|---|---|
| Ethyl cellulose | 75 |
| Ethyl alcohol | 127 |
| Toluene | 298 |

The control showed evidences of rusting by the end of one day and thereafter showed increasing rusting.

EXAMPLE III

The alkyd resin used herein contained (in the combined form) 30 weight per cent of phthalic anhydride, had an oil length specified as "short" and an acid number of about 6. The other reactants which are used to produce the alkyd resin are glycerol and dehydrated castor oil fatty acids. The solvent-containing formulation used for coating steel was made up as follows:

|  | Parts by weight |
|---|---|
| Oxidizing type of oil-modified alkyd resin solution of 50 weight per cent of resin in 50 weight per cent xylene | 250 |
| Ethyl alcohol solution containing 6 weight per cent of di-cyclohexylamine nitrite | 208 |
| Toluene | 42 |

The above blended lacquer was painted onto the surface of a sand-blasted low carbon steel panel and handled in the same way as described in Example II above. After the first 15 days of test, no corrosion occurred, and the test was then continued at a temperature of 32° C. for an additional 18 days, again with no rust being formed. The temperature was then raised to 50° C., and after 13 days at this temperature, there were no signs of corrosion. The test on the control was done in the same way using the following formulation:

|  | Parts by weight |
|---|---|
| Oxidizing type of oil-modified alkyd resin solution, 50 weight per cent of resin in 50 weight per cent xylene | 250 |
| Ethyl alcohol | 19.5 |
| Toluene | 230.5 |

The control showed corrosion of the steel by the end of one day and thereafter showed increased rusting.

EXAMPLE IV

Eighteen grams of bleached white shellac was added to 32 grams of a solution of 2,2,6,6-tetramethylpiperidinium nitrite in ethyl alcohol containing 0.18 g. of the amine nitrite salt (the amine nitrite was 1% by weight of the solid content).

This coating solution was poured onto a smooth low carbon steel plate (panel) on a spinning table being rotated at 60 R. P. M. Each of the coated steel plates was spun 15 seconds and dried 106 hours in a cabinet at room temperature. A ¼ inch border was painted around all edges with red lead. Duplicate panels were suspended above 200 ml. of water in quart bottles for 355 hours at 100° F. No rust was present after this test on panels coated with shellac containing the amine nitrite salt while control panels coated with shellac only, rusted considerably.

The present application is a continuation-in-part of the copending application Serial No. 492,640, filed June 28, 1943, issued as United States Patent 2,419,327.

We claim as our invention:

1. A corrosion-inhibiting composition essentially comprising an alkyd resin coating material and an amount of di-cyclohexyl amine nitrite sufficient to render the material corrosion-inhibiting, said amount being between about 2 parts and about 20 parts by weight, for each 100 parts of said alkyd resin.

2. A corrosion-inhibiting composition essentially comprising an alkyd resin coating material and an amount of a di-cycloalkyl amine nitrite sufficient to render the coating material corrosion-inhibiting, said amount being between about 2 parts and about 20 parts by weight, for each 100 parts of said alkyd resin.

3. A corrosion-inhibiting composition essentially comprising an ethyl cellulose coating material and an amount of di-cyclohexyl amine nitrite sufficient to render the material corrosion-inhibiting, said amount being between about 2 parts and about 20 parts by weight, for each 100 parts of said ethyl cellulose.

4. The combination comprising a solid metal article and an ethyl cellulose coating material thereon, said coating containing an amount of di-cyclohexyl amine nitrite sufficient to render the coating corrosion-inhibiting, said amount being between about 2 parts and about 20 parts by weight, for each 100 parts of ethyl cellulose.

5. A method for inhibiting corrosion of a metal normally corrodible in the presence of water vapor and oxygen comprising applying a protective coating of ethyl cellulose to the metal, said coating containing between about 2 parts and about 20 parts by weight, for each 100 parts of ethyl cellulose, of dicyclohexyl amine nitrite.

6. A corrosion-inhibiting composition essentially comprising a coating material capable of forming a substantially non-fluent coherent coating adherent on the surface of a solid metal, and an amount of an organic base nitrite sufficient to render the coating corrosion-inhibiting, said amount being about 10% by weight based upon the weight of said coating material.

7. A corrosion-inhibiting composition essentially comprising an ethyl cellulose coating material and an amount of di-cyclohexyl amine nitrite sufficient to render the coating material corrosion-inhibiting, said amount being about 10 parts by weight for each 100 parts of said ethyl cellulose.

8. A corrosion inhibiting composition essentially comprising an ethyl cellulose coating material and an amount of an organic base nitrite sufficient to render the coating material corrosion-inhibiting, said amount being between about 2 parts and about 20 parts by weight for each 100 parts of said ethyl cellulose.

9. A corrosion inhibiting composition essentially comprising a resin base coating material capable of forming a substantially non-fluent, coherent coating adherent on the surface of the solid metal, and an amount of an organic base nitrite sufficient to render the coating material corrosion-inhibiting, said amount being between about 2 parts and about 20 parts by weight for each 100 parts of said resin base coating material.

10. A corrosion inhibiting composition essentially comprising a resin base coating material capable of forming a substantially non-fluent, coherent coating adherent on the surface of the solid metal, and an amount of dicyclohexyl amine nitrite sufficient to render the coating material corrosion-inhibiting, said amount being between about 2 parts and about 20 parts by weight for each 100 parts of said resin base coating material.

11. A corrosion inhibiting composition essentially comprising a resin base coating material capable of forming a substantially non-fluent, coherent coating adherent on the surface of the solid metal, and an amount of diisopropyl amine nitrite sufficient to render the coating material corrosion-inhibiting, said amount being between about 2 parts and about 20 parts by weight for each 100 parts of said resin base coating material.

12. A corrosion inhibiting composition essentially comprising a resin base coating material capable of forming a substantially non-fluent, coherent coating adherent on the surface of the solid metal, and an amount of an organic amine nitrite sufficient to render the coating material corrosion-inhibiting, said amount being between about 2 parts and about 20 parts by weight for each 100 parts of said resin base coating material.

13. A corrosion inhibiting composition essentially comprising a resin base coating material capable of forming a substantially non-fluent, coherent coating adherent on the surface of the solid metal, and an amount of a secondary amine nitrite sufficient to render the coating material corrosion-inhibiting, said amount being between about 2 parts and about 20 parts by weight for each 100 parts of said resin base coating material.

AARON WACHTER.
NATHAN STILLMAN.

REFERENCES CITED

The following references are of record in the file of this patent:

UNITED STATES PATENTS

| Number | Name | Date |
| --- | --- | --- |
| 2,111,342 | Waldeck | Mar. 5, 1938 |
| 2,148,862 | Kern | Feb. 28, 1939 |
| 2,308,282 | Howland et al. | Jan. 12, 1943 |
| 2,321,517 | Rosen | June 8, 1943 |
| 2,333,206 | Sloan | Nov. 2, 1943 |
| 2,402,551 | Holt | June 25, 1946 |
| 2,419,327 | Wachter et al. | Apr. 22, 1947 |